(12) United States Patent
Dietel

(10) Patent No.: US 7,409,387 B2
(45) Date of Patent: Aug. 5, 2008

(54) MATERIALIZED QUERY TABLE MATCHING WITH QUERY EXPANSION

(75) Inventor: John David Dietel, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 455 days.

(21) Appl. No.: 11/068,264

(22) Filed: Feb. 28, 2005

(65) Prior Publication Data

US 2006/0195437 A1 Aug. 31, 2006

(51) Int. Cl.
G06F 17/30 (2006.01)
G06F 7/00 (2006.01)

(52) U.S. Cl. .............................................. 707/4; 707/3
(58) Field of Classification Search ...................... 707/1, 707/3, 4
See application file for complete search history.

(56) References Cited

U.S. PATENT DOCUMENTS 6,449,605 B1 * 9/2002 Witkowski ...................... 707/3
6,496,819 B1 * 12/2002 Bello et al. ..................... 707/3
2002/0147714 A1 * 10/2002 Koo et al. ....................... 707/3

* cited by examiner

*Primary Examiner*—Sam Rimell
*Assistant Examiner*—Alicia M Lewis
(74) *Attorney, Agent, or Firm*—Biggers & Ohanian, LLP (57) ABSTRACT

Methods, apparatuses, and computer program products for materialized query table matching are provided that include receiving a database query, retrieving a materialized query table (MQT) from data storage accessible to a database management system, selecting a join in the materialized query table between a table that is not invoked by the query and a table that is invoked in the query, determining whether the selected join is lossless, and expanding the query to include the lossless join if the selected join is lossless, expanding the query to include the lossless join. Determining whether the selected join is lossless may be carried out by losslessly joining the table that is not invoked by the query to the query, and determining whether the lossless join to the query matches the selected join of the materialized query table.

3 Claims, 5 Drawing Sheets

MATERIALIZED QUERY TABLE MATCHING WITH QUERY EXPANSION

BACKGROUND OF THE INVENTION

1. Field of the Invention

The field of the invention is data processing, or, more specifically, methods, systems, and products for materialized query table matching.

2. Description Of Related Art

The development of the EDVAC computer system of 1948 is often cited as the beginning of the computer era. Since that time, computer systems have evolved into extremely complicated devices. Today's computers are much more sophisticated than early systems such as the EDVAC. The most basic requirements levied upon computer systems, however, remain little changed. A computer system's job is to access, manipulate, and store information. Computer system designers are constantly striving to improve the way in which a computer system can deal with information.

Information stored on a computer system is often organized in a structure called a database. A database is a grouping of related structures called 'tables,' which in turn are organized in rows of individual data elements. The rows are often referred to as 'records,' and the individual data elements are referred to as 'fields.' In this specification generally, therefore, an aggregation of fields is referred to as a 'data structure' or a 'record,' and an aggregation of records is referred to as a 'table.' An aggregation of related tables is called a 'database.'

A computer program that supports access to information in a database is typically called a database management system or a 'DBMS.' A DBMS is responsible for helping other computer programs access, manipulate, and save information in a database. A DBMS typically supports access and management tools to aid users, developers, and other programs in accessing information in a database. One such tool is the structured query language, 'SQL.' SQL is query language for requesting information from a database. Although there is a standard of the American National Standards Institute ('ANSI') for SQL, as a practical matter, most versions of SQL tend to include many extensions. Here is an example of a database query expressed in SQL:

select * from stores, transactions
    where stores.location="Minnesota"
    and stores.storeID=transactions.storeID This SQL query accesses information in a database by selecting records from two tables of the database, one table named 'stores' and another table named 'transactions.' The records selected are those having value "Minnesota" in their store location fields and transactions for the stores in Minnesota. In retrieving the data for this SQL query, a SQL engine will retrieve records from the stores table and records from the transaction table. Records that satisfy the query requirements then are combined in a 'join.'

To improve the performance of satisfying a query, many databases store the results of previous queries or portions of the results of previous queries and use the stored results to satisfy subsequent queries. Such stored results for performance enhancement are called materialized query tables ('MQT'). An MQT is a table whose definition is based on the result of a query, and whose data is in the form of pre-computed results that are taken from one or more tables.

An MQT does not have to contain the results of exactly the same query to be useful in subsequent queries. A subsequent database query can sometimes be satisfied using an MQT that is similar to the query. Consider the following MQT and database query.

The MQT:
    SELECT e.name empname, d.name deptname
    FROM employees e, departments d
    WHERE e.dept=d.id may be used to satisfy the query:
    SELECT e.name, d.name
    FROM employees e, departments d
    WHERE e.dept=d.id
    AND d.name='Engineering' by selecting records from the MQT such as:
    SELECT empname, deptname
    FROM mqt
    WHERE deptname='Engineering'

In this example the query selects a subset of the results of the MQT. One situation where MQTs are useful therefore includes queries whose results represent a subset of the selected records of the MQT. In some cases, the extra records are a result of having tables joined in the MQT that are not invoked in the query. One existing method of MQT matching useful in a situation where the MQT has one or more tables not invoked in the query is carried out by eliminating the extra table or tables from the MQT using referential integrity reduction until the MQT has no extra tables that are not in the query.

Another way where MQTs could be useful in satisfying the queries may involve expanding the query under certain circumstances to include tables that are joined in the MQT but are not in the query. Consider the following MQT:
    SELECT e.name empname, d.name deptname
    FROM employees e, departments d
    WHERE e.dept=d.id
    And the following query:
    SELECT e.name empname
    FROM employees e
    WHERE e.name LIKE 'A%'

In this example, the MQT references the departments table, but this query does not. The MQT may in fact satisfy the query if joining to the departments table is a lossless join. The phrase 'lossless join' means a join between a first table and a second table that returns the same number of records as the first table. That is, a lossless join does not produce 'fan out,' more records than the first joined table, or 'fan in,' less records than the first joined table. The use of the term 'first table' and 'second table' is simply used to distinguish two tables. There is no order requirement between the first or second table. The lossless join may be lossless with respect to either table. In this example, if the join is lossless, then the join to the departments table in the MQT merely widens the result set to include some department information. Such an MQT may be useful in materialized query table matching if the query can be properly expanded to match the MQT.

SUMMARY OF THE INVENTION

Methods, apparatuses, and computer program products for materialized query table matching are provided that include receiving a database query, retrieving a materialized query table from data storage accessible to a database management system, selecting a join in the materialized query table between a table that is not invoked by the query and a table that is invoked in the query, determining whether the selected join is lossless, and expanding the query to include the lossless join if the selected join is lossless.

Determining whether the selected MQT join is lossless may be carried out by losslessly joining the table that is not invoked by the query to the query, and determining whether the lossless join to the query matches the selected join of the materialized query table (MQT).

Losslessly joining the table that is not invoked by the query to the query may be carried out by identifying a primary key in the table not invoked by the query, identifying a foreign key in the table that is invoked by the query, identifying the same foreign key in the query, and losslessly joining the primary key of the table not invoked by the query to the same foreign key in the query. Losslessly joining the primary key of the table not invoked by the query to the same foreign key in the query is carried out by creating a join predicate that results in a lossless join between the primary key of the table not invoked by the query and the same foreign key of the query. Materialized query table matching according to embodiments of the present invention may also include creating a copy of the query and losslessly joining the primary key to the same foreign key of the copy of the query.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Materialized Query Table Matching

Figure 1:
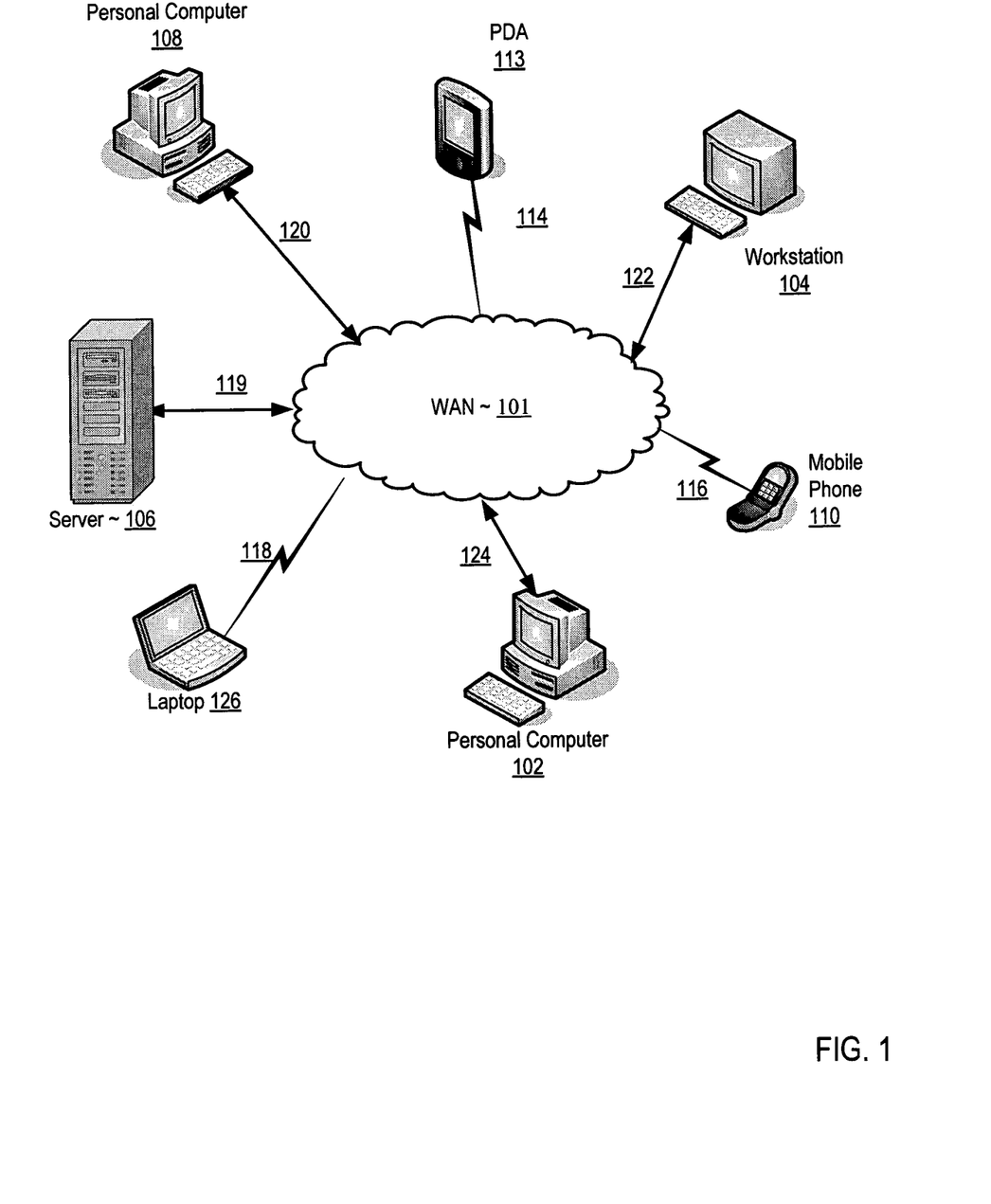
FIG. 1 sets forth a network diagram illustrating an exemplary system of computers each of which may support a database capable of materialized query table matching according to embodiments of the present invention.

Exemplary methods, apparatuses, and computer program products for materialized query table matching according to embodiments of the present invention are described with reference to the accompanying drawings, beginning with FIG. 1. FIG. 1 sets forth a network diagram illustrating an exemplary system of computers each of which may support a database capable of materialized query table matching according to embodiments of the present invention. The system of FIG. 1 includes a number of computers coupled for data communications to networks. The system of FIG. 1 includes a server (106) coupled for data communications to a wide area network ('WAN') (101) through a wireline connection (119), a personal computer (108) coupled to the WAN (101) through a wireline connection (120) and a PDA (113) coupled to the WAN (101) through a wireless connection (114). The system of FIG. 1 also includes a workstation (104) coupled to the WAN (101) through a wireline connection (122), a network enabled mobile phone (110) coupled to the WAN (101) through a wireless connection (116), a personal computer (102) coupled to the WAN (101) through a wireline connection (124), and a laptop (126) coupled to the WAN (101) through a wireless connection (118).

Each of the exemplary computers (113, 104, 110, 102, 108, 126, 106) of FIG. 1 have installed upon them a database management system capable of materialized query table matching according to embodiments of the present invention. Such database management systems operate generally by receiving a database query, retrieving a materialized query table from data storage accessible to a database management system, selecting a join in the materialized query table between a table that is not invoked by the query and a table that is invoked in the query and determining whether the selected join is lossless. If the selected join is lossless, the database management system operates by expanding the query to include the lossless join. Database management systems operating according to embodiments of the present invention repeatedly select MQTs, select join from the MQTS, determine whether the selected join is lossless, and expand the query if the join is lossless until the query is expanded to match the MQT thereby advantageously providing a vehicle for efficiently satisfying the query.

The term materialized query table or MQT is used in this specification to mean any stored results of previous queries or portion of results of previous queries. MQTs may also be known as 'automated summary tables' ('AST') or by other names as will occur to those of skill in the art and all such stored results are useful as MQTs according to embodiments of the present invention.

The phrase 'lossless join' means a join between a first table and a second table that returns the same number of records as the first table. That is, a lossless join does not produce 'fan out,' more records than the first joined table, or 'fan in,' less records than the first joined table. The use of the term 'first table' and 'second table' is simply used to distinguish two tables. There is no order requirement between the first or second table. The lossless join may be lossless with respect to either table.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP/IP, HTTP, WAP, HDTP, and others as will occur to those of skill in the art. Various embodiments of the present invention may be implemented on a variety of hardware platforms in addition to those illustrated in FIG. 1.

As mentioned above, materialized query table matching in accordance with the present invention is generally implemented with computers, that is, with automated computing machinery. For further explanation, FIG. 2 sets forth a block diagram of automated computing machinery comprising a computer (152) useful in materialized query table matching according to embodiments of the present invention. The computer (152) of FIG. 2 includes at least one computer processor (156) or 'CPU' as well as random access memory (168) ("RAM").

Figure 2:
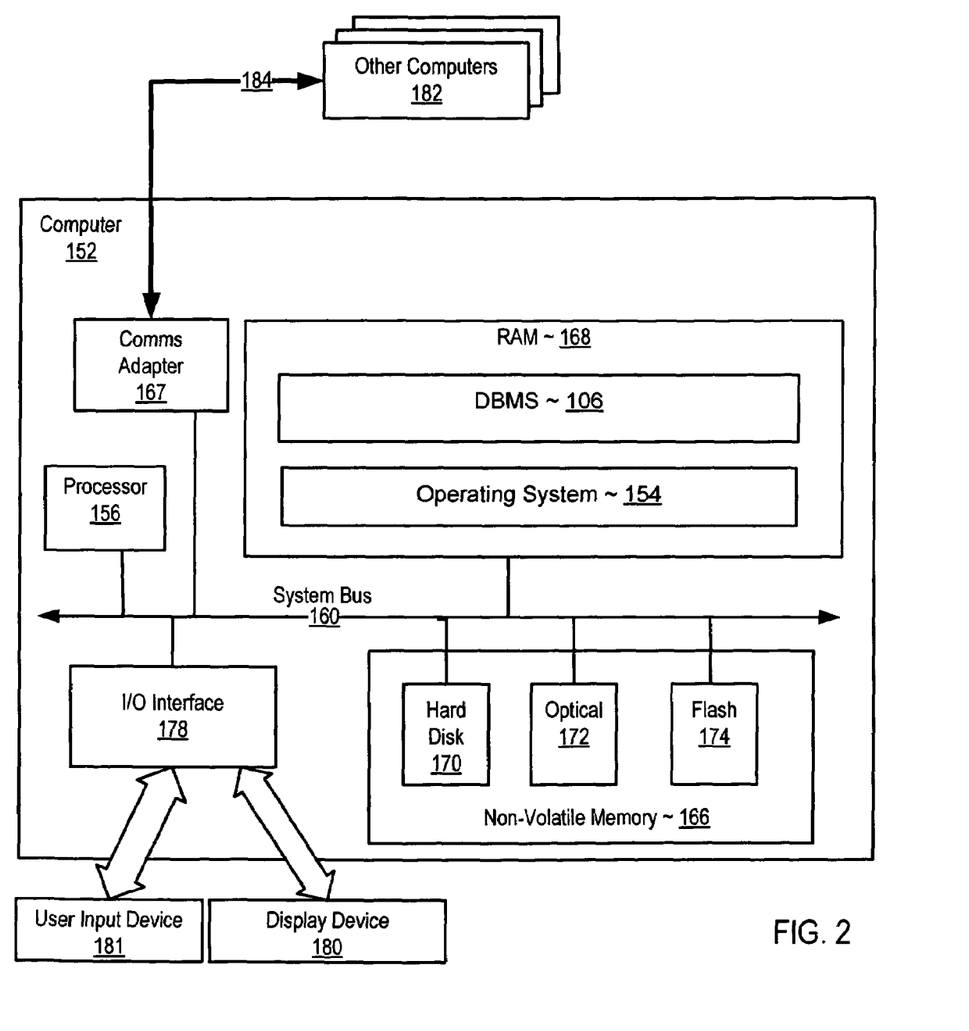
FIG. 2 sets forth a block diagram of automated computing machinery comprising a computer useful in materialized query table matching according to embodiments of the present invention.

Stored in RAM (168) is database management system (106). The exemplary database management system (106) of FIG. 2 is capable of materialized query table matching according to the present invention. The exemplary database management system (106) of FIG. 2 is capable of materialized query table matching by receiving a database query, retrieving a materialized query table from data storage accessible to a database management system, selecting a join in the materialized query table between a table that is not invoked by the query and a table that is invoked in the query, determining whether the selected join is lossless, and expanding the query to include the lossless join if the selected join is lossless. The exemplary database management system (106) of FIG. 2 repeatedly selects MQTs, selects joins from the MQTs, determines whether each selected join is lossless, and expands the query if the join is lossless until the query is expanded to match the MQT thereby advantageously providing a vehicle for efficiently satisfying query.

Also stored in RAM (168) is an operating system (154). Operating systems useful in computers according to embodiments of the present invention include Unix, Linux, Microsoft NT$_{TM}$, i5/OS, and many others as will occur to those of skill in the art. Operating system (154) and DBMS (106) are shown in RAM (168), but many components of such software typically are stored in non-volatile memory (166) also.

The computer (152) of FIG. 2 includes non-volatile computer memory (166) coupled through a system bus (160) to processor (156) and to other components of the computer. Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The example computer of FIG. 2 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

The exemplary computer (152) of FIG. 2 includes a communications adapter (167) for implementing data communications (184) with other computers (182). Such data communications may be carried out through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful for determining availability of a destination according to embodiments of the present invention include modems for wired dial-up communications, Ethernet (IEEE 802.3) adapters for wired network communications, and 802.11b adapters for wireless network communications.

Figure 3:
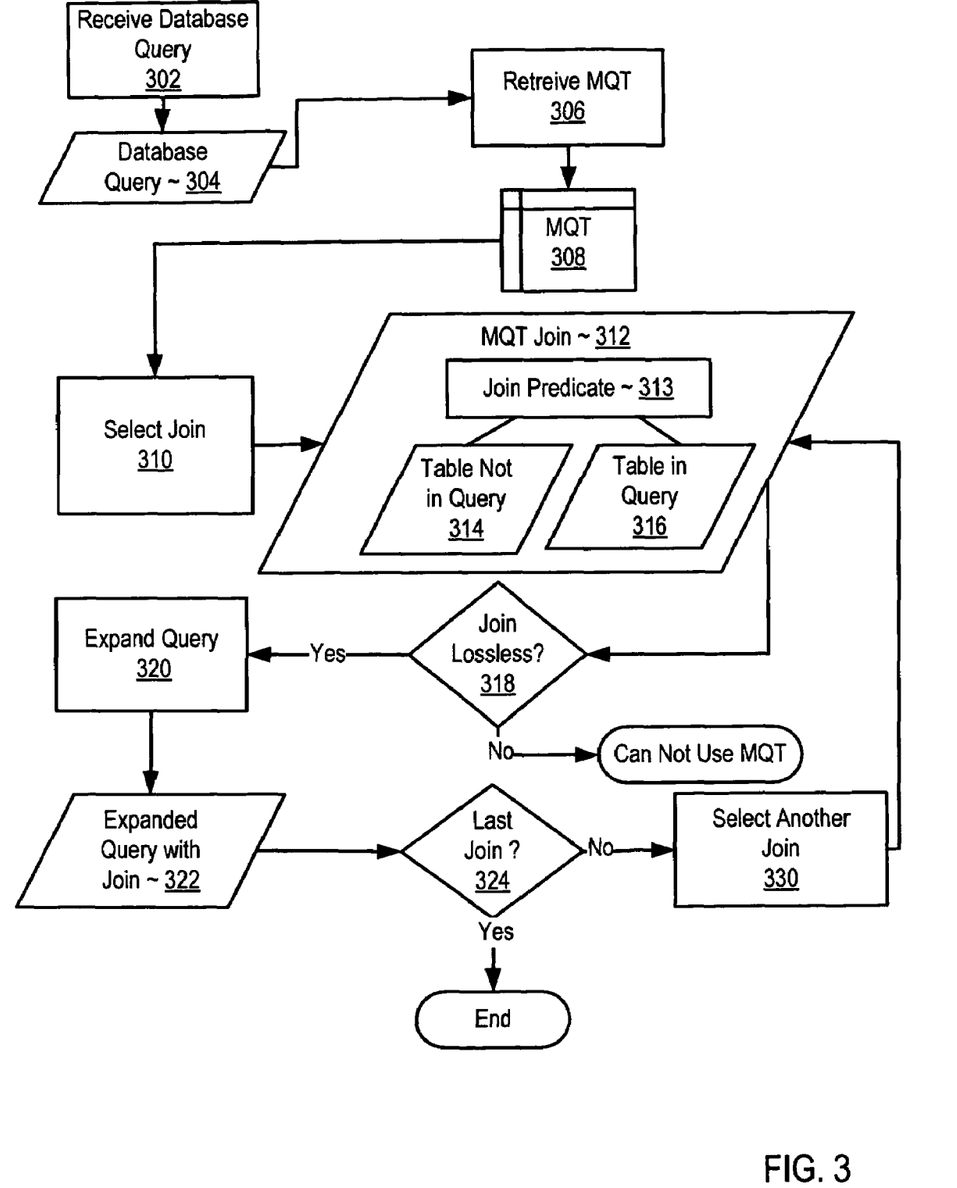
FIG. 3 sets forth a flow chart illustrating an exemplary method for materialized query table matching according to embodiments of the present invention.

For further explanation, FIG. 3 sets forth a flow chart illustrating an exemplary method for materialized query table matching according to embodiments of the present invention. The method of FIG. 3 includes receiving (302) a database query (304). The query (304) of FIG. 3 may be a SQL query or any other database query as will occur to those of skill in the art.

The method of FIG. 3 also includes retrieving (306) a materialized query table (308) from data storage accessible to a database management system. As discussed above, the term materialized query table or MQT is used in this specification to mean any stored results of previous queries or portion of results of previous queries. MQTs may also be known as 'automated summary tables' ('AST') or by other names as will occur to those of skill in the art and all such stored results are useful as MQTs according to embodiments of the present invention. Retrieving (306) a materialized query table (308) from data storage according to the method of FIG. 3 may be carried out by retrieving an MQT at random from data storage, retrieving an MQT in an ordered manner from data storage such as incrementally or algorithmically by MQT ID, or any other way of retrieving a MQT that will occur to those of skill in the art.

The method of FIG. 3 also includes selecting (310) a join in the materialized query table (308) between a table (314) that is not invoked by the query and a table (316) that is invoked in the query. Selecting (310) such a join (312) in the materialized query table (308) may be carried out by retrieving a join in the MQT and determining whether one of the tables in the join is invoked in the query and whether the other table in the join is not invoked in the query.

The method of FIG. 3 also includes determining (318) whether the selected join (312) is lossless. The phrase 'lossless join' means a join between a first table and a second table that returns the same number of records as the first table. That is, a lossless join does not produce 'fan out,' more records than the first joined table, or 'fan in,' less records than the first joined table. The use of the term 'first table' and 'second table' is simply used to distinguish two tables. There is no order requirement between the first or second table. The lossless join may be lossless with respect to either table. Determining (318) whether the selected join (312) is lossless may be carried out by losslessly joining the table that is not invoked by the query to the query to create a known lossless join and determining whether the lossless join to the query matches the selected join of the materialized query table as discussed in more detail with reference to FIGS. 4 and 5.

If the selected join (312) is lossless, the method of FIG. 3 also includes expanding (320) the query (322) to include the lossless join. Expanding the query to include the lossless join is typically carried out by including in the query the table (314) that was added to the query to determine whether the MQT join was lossless. That is, expanding the query is typically carried out by saving the known lossless join added to the query as part of the query. Creating the known lossless join included in the expanded query is discussed in more detail with reference to FIGS. 4 and 5.

If the selected join (312) is not lossless, then the MQT (308) is not available for MQT matching according to the method of FIG. 3 and the MQT is simply discarded. In some embodiments, another MQT may be selected and the method of FIG. 3 may be repeated.

After expanding the query to include the lossless join, the method of FIG. 3 continues by determining (324) whether all the joins in the materialized query table have been selected and selecting (330) another join if all the joins in the materialized query table have not been selected.

The method of FIG. 3 expands the query to include lossless joins found in the MQT. For further explanation therefore, FIG. 4 sets forth a flow chart illustrating an exemplary method for determining (318) whether the selected join (312) is lossless. The method of FIG. 4 includes losslessly joining (402) the table (314) that is not invoked by the query to the query to create a known lossless join (404) and determining (406) whether the known lossless join (404) to the query (304) matches the selected join (312) of the materialized query table. If the known lossless join (404) to the query (304) matches the selected join (312) of the materialized query table, then the selected join is determined to be lossless. If the known lossless join (404) to the query (304) does not match the selected join (312) of the materialized query table, then the selected join is not determined to be lossless. In summary, the method of FIG. 4 identifies that the selected join is lossless by creating a known lossless join and then determining whether the selected join matches the known lossless join.

Figure 4:
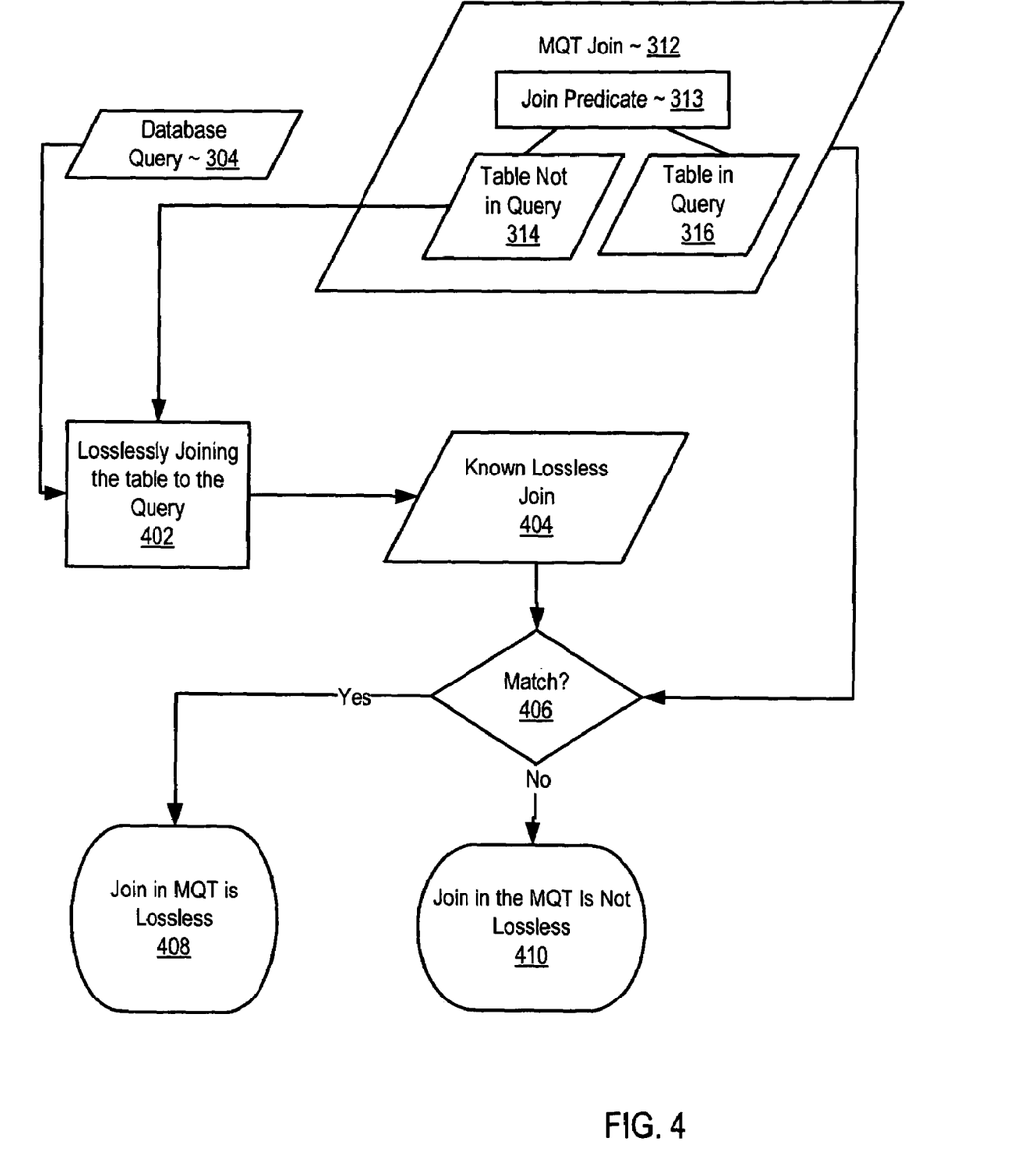
FIG. 4 sets forth a flow chart illustrating an exemplary method for determining whether a selected join in an MQT is lossless.

Losslessly joining (402) the table (314) that is not invoked by the query to the query to create a known lossless join (404) is carried out by creating a join predicate that results in a lossless join between the primary key of the table not invoked by the query and the same foreign key of the query. Constructing a join predicate such that one and only one record is returned for each record in the table in the query may be carried out through the use of referential integrity constraints enforced on the DBMS. Referential integrity constraints are rules that enforce required relationships among tables in the database and prevent users or applications from entering data inconsistent with those rules. Referential integrity rules for example may specify that whenever a user or application deletes a record from Table A, any records in Table B that are linked to the deleted record must also be deleted or the record in Table A cannot be deleted. Referential integrity rules may also specify for example that whenever you modify the value of a linked field in Table A, all records in Table B that are linked to the field will also be modified accordingly.

For further explanation of losslessly joining tables to create a known lossless join by using referential integrity constraints, consider the following example of a join between an employees table and a zip code table. The employees table includes records for employees uniquely identified by a social security number. The employees table is linked to a zip code table through a zip code column in the employees table which includes a residential zip code for each employee. Each record in the employee table has one and only one zip code for each employee. A related zip code table includes a zip code column, as well as another column associating a city with each zip code. Referential integrity constraints in the example dictate that only one zip code may be designated as the residential zip code for an employee. Referential integrity constrains in this example also dictate that for each zip code in the employees table one record and only one record exists in the zip code table. An exemplary join between the employees table and the zip code table designed to return for each employee a residential city is lossless because referential integrity constraints for zip code dictate that one and only one record from the zip code table is returned for each employee in the employee table.

Figure 5:
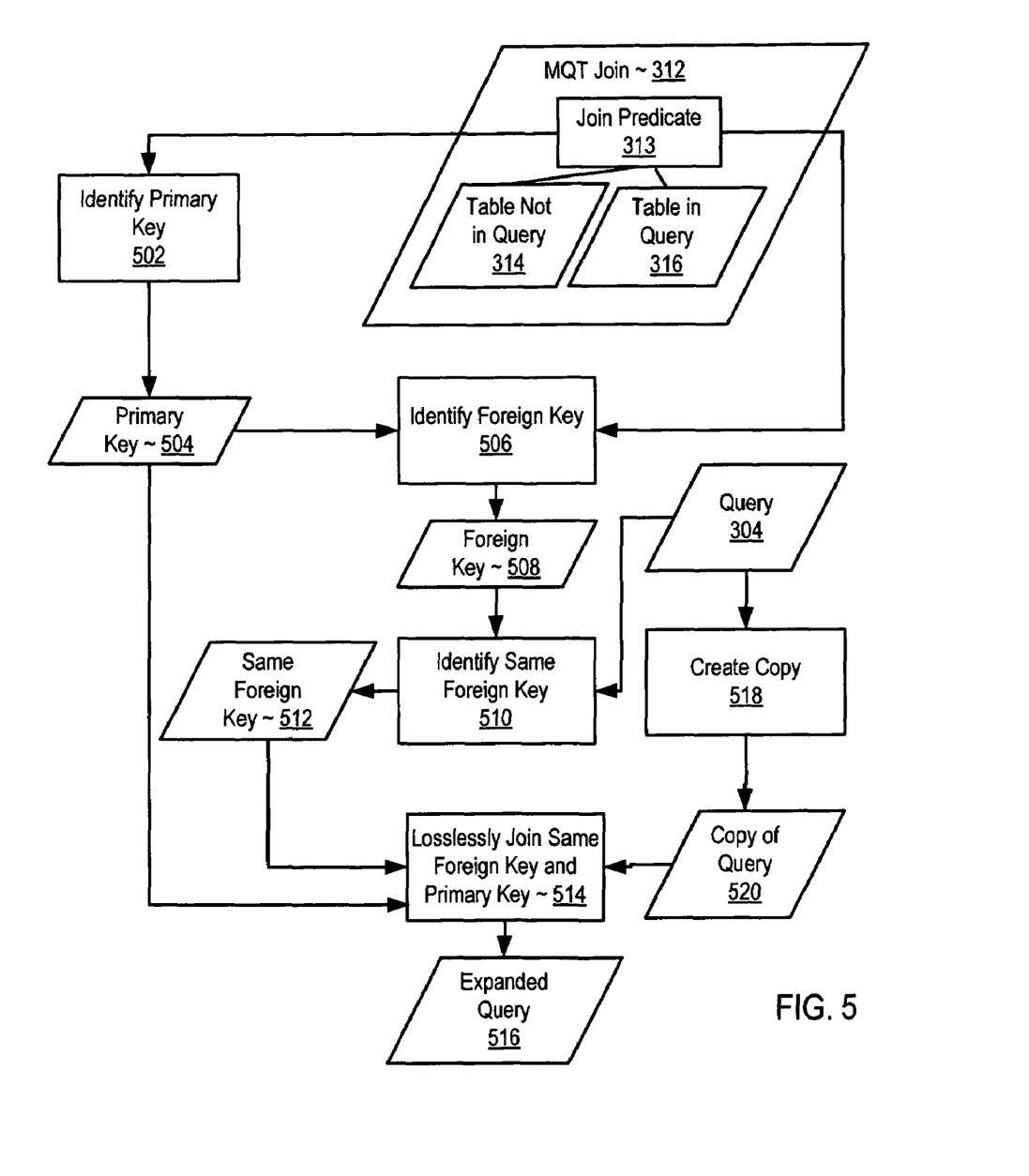
FIG. 5 sets forth a flow chart illustrating an exemplary method for losslessly joining the table that is not invoked by the query to the query.

For even further explanation of losslessly joining (402) the table (314) that is not invoked by the query to the query to create a known lossless join (404) for use in determining whether a selected join in the MQT is lossless, FIG. 5 sets forth a flow chart illustrating an exemplary method for losslessly joining the table (314) that is not invoked by the query to the query (304). The method of FIG. 5 includes identifying (502) a primary key (504) in the table (314) not invoked by the query. Identifying (502) a primary key (504) in the table (314) not invoked by the query is carried out by identifying from the join predicate (313) the primary key of the table not invoked by the query. A primary key of a table in a relational database uniquely identifies each record in the table. The primary key can either be a normal attribute that is guaranteed to be unique (such as the social security number in the exemplary employees table above or it can be generated by a database management system issuing a globally unique identifier for the record. Identifying (502) a primary key (504) in the table (314) not invoked by the query may be carried out by querying the database management system for the primary key.

The method of FIG. 5 also includes identifying (506) a foreign key (508) in the table (316) that is invoked by the query and identifying (510) the same foreign key (512) in the query (304). Identifying (506) a foreign key (508) in the table (316) that is invoked by the query (502) may be carried out by identifying from the join predicate (313) the foreign key of the table that is invoked by the query. A foreign key is a field in a relational table that matches the primary key column of another table. The foreign key is often used to cross-reference tables. Identifying (506) a foreign key (508) in the table (316) of the MQT and identifying (510) the same foreign key (512) in the query (304) may be carried out by searching the table in the MQT for a foreign key matching the table of the query.

The method of FIG. 5 includes creating (518) a copy (520) of the query (304) and losslessly (514) joining the primary key (504) to the same foreign key (512) of the copy (520) of the query (304). Creating a copy of the query advantageously provides a disposable form of the query for use in carrying out the steps of query expansion for materialized query table matching according to embodiments of the present invention.

For even further explanation, consider the following example of MQT matching according to the present invention to expand this query:

Query
SELECT e.name empname
FROM employees e
WHERE e.name LIKE 'A%'
To match this MQT:
MQT
SELECT e.name empname, d.name deptname
FROM employees e, departments d
WHERE e.dept=d.id MQT matching according to this example proceeds by selecting a join in the materialized query table between a table that is not invoked by the query and a table that is invoked in the query. In this example, such join is between the departments table and the employees table.

MQT matching according to this example proceeds by identifying from the join predicate a primary key in the table not invoked by the query. In this example, the primary key is the ID column of the departments table.

MQT matching according to this example proceeds by identifying from the join predicate a foreign key in the table that is invoked by the query. In this example the foreign table is the employees table and the foreign key is the department column of the foreign table.

MQT matching according to this example proceeds by identifying the same foreign key in the query. In this example, the same foreign table is the employees table and the foreign key is also the department column of the foreign table.

MQT matching according to this example proceeds by losslessly joining the primary key of the table not invoked by the query to the same foreign key in the query. In this example, losslessly joining the primary key of the table not invoked by the query to the same foreign key in the query is carried out by creating a join predicate that implements a lossless join between the existing foreign table (employees) and the new primary table (departments). In this example the following join predicate e.dept=dept.id implements a lossless join.

MQT matching according to this example proceeds by determining whether the lossless join to the query matches the selected join of the materialized query table. In this example, the known lossless join expanded to the query using the predicate e.dept=d.id now matches the join in the MQT. The join in the MQT is therefore lossless and the MQT may be useful in satisfying the query.

MQT matching according to this example proceeds by repeating the steps above for all joins in the MQT until all unmatched tables in the MQT have new matches created in the query.

Exemplary embodiments of the present invention are described largely in the context of a fully functional computer system for materialized query table matching. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets$_{198}$ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for materialized query table matching, the method comprising:
   receiving a database query;
   retrieving a materialized query table from data storage accessible to a database management system;
   selecting a join in the materialized query table between a table that is not invoked by the query and a table that is invoked in the query;
   determining whether the selected join is lossless including:
      losslessly joining the table that is not invoked by the query to the query including:
         identifying a primary key in the table not invoked by the query;
         identifying a foreign key in the table that is invoked by the query;
         identifying the same foreign key in the query;
         losslessly joining the primary key of the table not invoked by the query to the same foreign key in the query including:
            creating a copy of the query;
            losslessly joining the primary key to the same foreign key of the copy of the query;
      determining whether the lossless join to the query matches the selected join of the materialized query table; and
   if the selected join is lossless, expanding the query to include the lossless join.

2. The method of claim 1 further comprising determining whether all the joins in the materialized query table have been selected; and
   selecting another materialized query table if all the joins in the materialized query table have been selected.

3. An apparatus for materialized query table matching, the apparatus comprising:
   a computer processor;
   a computer memory coupled for data transfer to the processor, the computer memory having disposed within it computer program instructions comprising:
   a database management system; the database management system capable of:
      receiving a database query;
      retrieving a materialized query table from data storage accessible to a database management system;
      selecting a join in the materialized query table between a table that is not invoked by the query and a table that is invoked in the query;
      determining whether the selected join is lossless including:
         losslessly joining the table that is not invoked by the query to the query including:
            identifying a primary key in the table not invoked by the query;
            identifying a foreign key in the table that is invoked by the query;
            identifying the same foreign key in the query;
            losslessly joining the primary key of the table not invoked by the query to the same foreign key in the query including:
               creating a copy of the query;
               losslessly joining the primary key to the same foreign key of the copy of the query;
         determining whether the lossless join to the query matches the selected join of the materialized query table; and
      if the selected join is lossless, expanding the query to include the lossless join.

* * * * *